US009467307B2

(12) United States Patent
Divivier (10) Patent No.: US 9,467,307 B2
(45) Date of Patent: Oct. 11, 2016

(54) METHOD OF TRACKING ARRIVAL ORDER OF PACKETS INTO PLURAL QUEUES

(75) Inventor: Robert Divivier, San Jose, CA (US)

(73) Assignee: Microsemi Storage Solutions (US), Inc., Aliso Viejo, CA (US)

( * ) Notice: Subject to any disclaimer, the term of this patent is extended or adjusted under 35 U.S.C. 154(b) by 1115 days.

(21) Appl. No.: 12/200,062

(22) Filed: Aug. 28, 2008

(65) Prior Publication Data

US 2010/0054268 A1    Mar. 4, 2010

(51) Int. Cl.

| H04L 12/54 | (2013.01) |
|---|---|
| G06F 13/40 | (2006.01) |
| H04L 12/801 | (2013.01) |
| H04L 12/863 | (2013.01) |
| H04L 12/865 | (2013.01) |
| H04L 12/861 | (2013.01) |
| H04L 12/879 | (2013.01) |

(52) U.S. Cl.
CPC ....... *H04L 12/5693* (2013.01); *G06F 13/4022* (2013.01); *H04L 47/10* (2013.01); *H04L 47/624* (2013.01); *H04L 47/6215* (2013.01); *H04L 47/6275* (2013.01); *H04L 49/90* (2013.01); *H04L 49/901* (2013.01); *H04L 49/9057* (2013.01); *H04L 49/9094* (2013.01); *G06F 2213/0026* (2013.01)

(58) Field of Classification Search
None
See application file for complete search history.

(56) References Cited

U.S. PATENT DOCUMENTS

| 5,892,979 | A  | * | 4/1999  | Shiraki et al. ................ 710/52 |
|---|---|---|---|---|
| 5,996,019 | A  | * | 11/1999 | Hauser et al. ............... 709/235 |
| 6,526,495 | B1 | * | 2/2003  | Sevalia et al. ............... 711/173 |
| 6,556,572 | B1 | * | 4/2003  | Ishida ...................... 370/395.41 |
| 6,603,772 | B1 | * | 8/2003  | Moussavi et al. ........... 370/432 |
| 6,738,371 | B1 | * | 5/2004  | Ayres ........................... 370/352 |
| 6,985,451 | B1 | * | 1/2006  | Nattiv et al. ................. 370/277 |
| 7,221,678 | B1 | * | 5/2007  | Hughes ......................... 370/412 |
| 7,400,629 | B2 | * | 7/2008  | Blanc et al. .................. 370/394 |
| 8,098,674 | B2 | * | 1/2012  | Sekido et al. ................ 370/412 |
| 2001/0033581 | A1 | * | 10/2001 | Kawarai et al. ............. 370/468 |
| 2005/0053078 | A1 | * | 3/2005  | Blanc et al. ............. 370/395.72 |
| 2005/0083920 | A1 | * | 4/2005  | Barri et al. ................... 370/360 |
| 2005/0182887 | A1 | * | 8/2005  | Sakurai et al. .............. 710/315 |
| 2005/0259651 | A1 | * | 11/2005 | Yashima ....................... 370/389 |
| 2005/0281259 | A1 | * | 12/2005 | Mitchell ...................... 370/389 |
| 2007/0201360 | A1 | * | 8/2007  | Hung et al. .................. 370/230 |

* cited by examiner

*Primary Examiner* — Chirag Shah
*Assistant Examiner* — Joshua Smith
(74) *Attorney, Agent, or Firm* — Glass & Associates (57) ABSTRACT

In PCI-Express and alike communications systems, it is often desirable to keep track of order of arrival into different queues of packets that will later compete for servicing by a downstream resource of limited bandwidth. Use of time stamping to determine order of arrival can be a problem because time of arrival between different packets entering respective ones of plural queues can vary greatly and thus the number of bits consumed for accurately time stamping each packet can become significant. Disclosed are systems and methods for tracking the arrival orders of packets into plural queues by means of travel-along dynamic counts rather than by means of high precision time stamps. A machine system that keeps track of relative arrival orders of data blocks in different ones of plural queues comprises a first count associater that associates with a first data block in a first of the plural queues, a first count of how many earlier arrived and still pending data blocks await in a second of the plural queues; and a count updater that updates the first count in response to one or more of said earlier arrived data blocks departing from the second queue.

21 Claims, 5 Drawing Sheets

METHOD OF TRACKING ARRIVAL ORDER OF PACKETS INTO PLURAL QUEUES

CROSS REFERENCE TO CO-OWNED APPLICATION

The following copending U.S. patent application is owned by the owner of the present application, and its disclosure is incorporated herein by reference:

(A) Ser. No. 11/390,754 filed Mar. 28, 2006 by Nadim Shaikli and originally entitled, "Packets Transfer Device Having Data Absorbing Buffers with Elastic Buffer Capacities".

FIELD OF DISCLOSURE

The present disclosure of invention relates generally to multi-queue systems wherein competing packets queue up in different queues to await service by a downstream resource of limited bandwidth. For sake of fairness in resource allocation at the downstream end, it is desirable to know which of the packets arrived first, which second and so on at the entrance points of the plural queues.

DESCRIPTION OF RELATED TECHNOLOGY

The use of digitally-encoded packets in telecommunication and/or networked systems is well known. Typically each packet is layered like an onion to have header-type outer shell sections, a payload core section and one or more error correction sections that cover various parts of the core and/or outer shells. Packets may be transmitted individually or as parts of relatively continuous streams or bursts depending on quality of service requirements and/or availability of bandwidth in available transmission links. When packet signals are transmitted from a source device to a receiving device, the packet signals that arrive at the receiving device typically progress through a physical interface layer (PHY), and then through one or both of a data link layer (DL) and a transaction layer (TL). The physical interface layer (PHY) may include means for serializing and deserializing data (SERDES). The data link layer (DL) may include means for managing error checking and error correction (e.g., ECC, CRC). The transaction layer (TL) may include means for parsing (peeling the onion skin layers of) different parts of each kind of packet so as to get to desired portions of the payload data. Payload data from sequentially ingressing packets may sometimes need to be reordered for purposes of satisfying priority transmission needs or for reconstructing an original data sequence different from the ingress sequence, where the original data sequence may, for example, be required for reconstituting a rasterized graphic image. Packet signals leaving a source device typically progress in the reverse order, namely, first by moving outgoing payload data through the transaction layer (TL), then through the data link layer (DL) and finally through the sender's physical interface layer (PHY) for output onto a physical transmission media (e.g., a high frequency cable or printed circuit strip).

Packet data that is ingressing into a receiving device typically gets routed to a parallel set of buffers (e.g., First-In, First-Out data storage buffers) before being further processed and then being output via one or more egress channels. The buffers act somewhat like shock absorbers in that each absorbs and smoothes out the often-bursty nature of ingressing data streams on each respective data channel and then stores the data until it is ready to be processed and/or egressed along a respective egress channel.

While packet data is queued up within a plurality of queues and awaiting egress or further processing, it is common to conduct an arbitration process for determining which among the multiple queues will be serviced ahead of others of the queues. The reason why arbitration is often employed is because generally the circuitry downstream of the queues has limited bandwidth and/or buffer capacity and thus cannot process all the data from all the queues simultaneously. Additionally, some of the data streams may have higher priority than others and may need to get through faster. It is often desirable to show some fairness in the downstream resource allocation process (e.g., arbitration) by taking into account which front-of-line packet among the plural queues arrived first, which arrived second and so on.

One conventional arbitration paradigm keeps track of the precise arrival times of all packets in their respective queues so as to thereby keep track of which queued-up packet arrived first, second and so on. Upon arrival into its respective queue, each packet has a time stamp (TS) of predefined bit length attached to it. As queued-up packets shift into position for leaving their respective queues (e.g., FIFO's) an arbiter examines the time stamps of packets awaiting departure from the respective departure gates (front of lines) of their resource queues. In essence, these front-of-the-line packets in the different queues are contending with each other for next service by a next available queue-servicing resource. To keep things fair, the arbiter checks the arrival time stamps in order to determine which of the awaiting packets came first, which second, and so on. In other words, a conventional arbitration paradigm may use the relative arrival times of the service ready packets as a factor in determining what ordering of service will be fair to the awaiting packets. Alternatively or additionally, the arbitration paradigm may use the aging of packets in their respective queues (current time minus time-stamped arrival time) as a factor in determining what ordering of service will be fair given their individual wait times in their respective queues and possibly further based on other factors (e.g., payload priority, etc.).

The time stamping method works reasonably well within systems that employ transmission links of relatively uniform speed and that receive data into their various queues and output data from the different queues according to a relatively smooth (e.g., flat) distribution function. In such cases, designers can determine with some degree of confidence what to expect in terms of average waiting times for all packets in their respective queues and what to expect as an extreme longest wait time. (In some protocols, longest wait time is defined by the protocol and packets whose stamps show aging beyond that limit are kicked out of the queue (e.g., invalidated) without receiving service. For example, in a so-called PCI-Express protocol, the longest wait time for a packet can be set by a user to be as little as about 50 ms and up to a maximum of about 1 second, at which point the queued up packet is deemed expired.) If congestion occurs in a downstream part of the packet flows, in-queue packets can begin to accumulate and their wait times grow. Designers who use the time stamping method often need to set the bit lengths of their time stamp fields (the number of bits in each field) sufficiently large so as to accommodate the largest expected wait time. And herein lays a problem. As time stamp fields become longer and longer, more system resources including memory space are consumed for supporting their increased number of bits. Additionally, during a time-critical arbitration round of limited cycle time, all the bits of a first time stamp (in a first front-of-line packet) need to be quickly compared against all the bits of every other time stamp among the other front-of-line packets in order to determine which packet came first, which next and so on. Processing burden on the arbitration process can grow geometrically as the number of contending queues grows and as the number of bits per time stamp grows.

Recently, a number of communication protocols have started gaining favor within the industry wherein the number of contending queues can grow. For example, a large number of virtual queues can be defined and arbitration may have to compare time stamps of packets waiting at the front-of-line of all these numerous queues. If longest wait time per queue is also allowed to increase, bandwidth of the arbitration process is taxed by the number of bits-per-time-stamp multiplied by the number of queues. Throughput rates for communication protocols have also been increasing on a historical basis. This means that there is a shrinking time window within which it is required to compare time stamps of increasing size (larger numbers of bits per time stamp) and to do so for a growing number of contending queues. This is a problem.

In terms of more details, the recent trend in communication protocols has been towards use of programmably or dynamically variable data rates per channel so as to allow for a variable number of virtual channels (and/or a variable number of physical channels). Packets of widely varying lengths may be supported within these variable rate protocols. Included among the emerging protocols are the PCI-Express™ protocol and the HyperTransport™ protocol. These industry standardized protocols allow different logical channels to each have a different, programmably-established or dynamically-defined channel configuration, including a different maximum data rate for each channel. For example, one logically-configured communication channel may be programmably or dynamically formed as an aggregation of many, relatively slow sub-channel resources (e.g., PCI-Express lanes) while another logically-configured channel may be variably formed to have one or just a few, such slow or basic sub-channel resources (e.g., lanes) or even a virtual fraction of single lane. The data bandwidth of the channel containing the greater number of basic sub-channel resources will generally be larger (have a faster data throughput ability) than the data bandwidth of the channel having just one or few sub-channel resources aggregated together (or a fraction of a single resource). A trade off is generally made between number of sub-channel resources consumed per communication channel and the bandwidth of each such channel. In the realm of PCI-Express™, the aggregated variable bandwidth channel resources are sometimes referred to as logical "ports" or "links" and the lowest common speed, for a non-fractured sub-channel resource at the physical layer level is often referred to as a "lane". Lanes may be selectively aggregated together to define higher speed or lower speed ports in PCI-Express systems as appropriate for given circumstances. Physically aggregated ports may be selectively bifurcated by software to define larger numbers of virtual channels per port albeit with lower bandwidths per virtual channel. Depending on how the sub-channel resources are aggregated and/or virtually bifurcated, in some instances a large number of slow moving queues may be formed where, due to downstream congestion, each queue may be packed with many packets and each of the many queues may thus have a relatively long wait time. As mentioned above, maximum wait time dictates the number of bits needed per time stamp. Processing burden on the arbitration process tends to be a function of the number of bits per time stamp multiplied by the number of contending channels.

It is therefore in this realm that the conventional time stamping approach can begin to run into problems as the number of channels increases and the maximum wait time per channel also increases. Since channel throughput rates can vary over very large ranges, and since some packets can be very large while others are substantially smaller, under some protocols designers may be forced to employ extremely long time stamps (ones with many bits per stamp) for covering all the worst case scenarios. More specifically, if packets one and two are very long and channel speed is set to slow, then the absolute time difference between completed arrival of packets one and two will be a large number—thus arguably calling for many bits in each time stamp. On the other hand, if channel speed and packet size are switched respectively to fast and short, the resolution needed for tracking the absolute time difference between completed arrivals of packets one and two will be a fine resolution one; where this also arguably calls for many bits per time stamp because in such a speed/size variable environment one needs to have enough time stamp bits to cover the full range of possibilities between fast and short versus slow and long. Extra-long time stamps are disadvantageous in that they can undesirably consume transmission bandwidth and/or they can consume a given percentage of scarce memory space.

Additionally within the realm of queue design, it had been conventional to configure all the packet receiving buffers (queues) of a communications or network device to be of the same depth and width. More recently, it has been proposed to have queues of variable lengths so as to make more efficient use of scarce data storage resources. This is another area in which the extra-long lengths possible with conventional time stamping can present a problem. The large numbers of storage bits consumed by each of the extra-long time stamps can operate to defeat the objectives of variable depth buffer control, namely efficient use of limited storage capacity by squeezing each individual buffer's size down close to limit of what is actually needed by its respective channel.

For purpose of additional background information, the establishment of variable bandwidth links in the PCI-Express 1.0™ protocol as an example is discussed. When a PCI-Express™ network is being adaptively configured or re-configured during network bring-up or reboot, the associated software determines how many lanes (subchannel resources) to assign to each PCI-Express™ "port" or PCIe logical "link" (the terms PCIe port and PCIe link are sometimes used interchangeably) so as to thereby define the maximum data throughput rate supported by that port. For example, a first PCIe port may be programmably configured (during network boot-up) to consist of an aggregation of 8 basic hardware lanes with a lowest common bandwidth per lane in the PCI-Express 1.0™ protocol being for example 2.5 Gb/s (Giga-bits per second) thus giving the ×8 first Port an aggregated bandwidth of 20 Gb/s. That first port can support a corresponding single channel of 20 Gb/s bandwidth or multiple virtual channels with lower bandwidths that can add up to as much as 20 Gb/s. At the same time, a second PCIe port can be programmably configured during the same network boot-up to consist of an aggregation of just 4 basic lanes, thus giving that ×4 second Port an aggregated bandwidth of 10 Gb/s. A third PCIe port can be programmably configured during the same network boot-up to consist of just one lane; thus giving that ×1 Port a bandwidth of just 2.5 Gb/s. In a subsequent boot-up, the first through third ports may be reconfigured differently due to flexible resource negotiations that can take place during each network reconfiguration.

In a PCIe system, it is possible for a multi-ported switching device to have one of its ports logically configured after bring-up as an aggregation of 2 basic lanes (thus giving the ×2 Port a 5.0 Gb/s bandwidth) and another of its ports configured as one lane (a 2.5 Gb/s bandwidth for that communications port) due to adaptive link negotiations that take place during network bring-up. However, despite the possibly different bandwidths that might be dynamically or programmably assigned to each of its ports (or virtual channels), the conventional switching device will typically employ fixed-length time stamps for managing arbitration among competing queues. This too can create inefficiencies and/or errors as will become clearer in the below detailed description.

Incidentally, although the PCI-Express 1.0™ protocol is mentioned above, the present disclosure is not limited to that protocol. Designs of second and third generation, PCI-Express protocols 2.0 and 3.0 are in development and it is expected that the present disclosure will also be applicable to PCI-Express 2.0 and 3.0 as well as to later generations. The newer, faster but backwardly compatible version 2.0 of PCI-Express typically operates at 5.0 Gb/s per lane and the yet newer, faster version 3.0 of PCI-Express is in the works with expected speeds of 8 GigaTransfers per second per lane although that is not finalized at the time of this writing.

SUMMARY

Structures and methods may be provided in accordance with the present disclosure of invention for improving over the above-described, conventional time stamp based approaches for tracking packet arrival order among plural queues (real or virtual).

An arbitration system in accordance with the present disclosure provides a respective counter for each of a plurality of competing queues where the counter keeps track of the current number of packets (or of other data blocks) awaiting service and residing in that queue. When an awaiting packet (or packet payload or other such data block) is pulled out of the queue for purpose of being serviced or otherwise, the Current Count of Awaiting Packets—or of other awaiting data blocks—(the CCAP) that is maintained by that counter for its queue is decremented. When a new packet arrives into the queue for awaiting service therein, the CCAP is incremented. For purpose of discussion regarding what is stored in each queue, packet and packet payload will be treated as synonymous. Aside from storing entire packets or packet payloads in a given queue, systems in accordance with the present disclosure may be designed to store other forms of predefined data blocks of varying lengths that are serviced after waiting their turns in plural queues where the serviced blocks may be later compiled for example to form entire packets or packet payloads. In this regard, it is to be understood that that written disclosure reference within the specification to a packet stored in a queue may also be understood to cover a predefined data block of optionally varying length that may be stored in one of plural queues. The term packet may be understood, unless otherwise stated, to mean either a whole packet (with header, payload and error correction trailer) or just a packet payload.

In one embodiment, each of plural packets arriving for storage in respective ones of plural queues (real or virtual) has attached to it or otherwise associated with it, not the current CCAP (Current Count of Awaiting Packets) of its own given queue, but rather the CCAP's of one or more of the other queues whose outputs compete with one another and with the output of the given queue for grant of service by one or more downstream and limited resources (e.g., passage through a switch fabric or transmission through a transmission link of limited bandwidth). The grant of service may be controlled by an automated arbiter and/or service scheduler. While a given packet waits in its own given queue for ultimate grant of service (not always given), the attached/associated instance of CCAP values (which instance is referred to herein as the packet's COE data array, or Count Of Earlier-arrivals array) is updated each time a packet departs from (or is invalidated or expired within) one of those others of the competing-for-service queues. In one embodiment, the counts in the COE data array of each packet are not decremented to a value below zero or another predefined floor value. In other words, they saturate at a predefined floor count. When a COE-tracked given packet arrives at the departure gate (service gate) of its own given queue, its logically or physically attached COE data array value(s) will indicate how many valid packets (if any) in the others of the one or more competing queues arrived earlier than the given packet. An arbiter and/or scheduler can look at the attached COE data array values of all packets awaiting in the respective departure gates of their respective queues and the arbiter/scheduler can then determine relative arrival orders or at least it can determine which packet arrived before all others (it will be the one with the lowest COE counts, typically all zeroes—meaning no other packets arrived earlier into the collection of competing queues). The COE-tracked packets that have relatively small valued counts in their COE's may be understood in certain circumstances to have arrived in the queues collection after a relatively small number of earlier arriving packets arrived in the other queues. On the other hand, COE-tracked packets that have relatively larger valued counts in their respective COE's may be understood to have arrived in the queues collection after a relatively larger number of earlier arriving packets arrived in the other queues. As mentioned, in one embodiment a departure awaiting packet with all its COE data array values equal to zero is understood to have no packets (zero packets) that arrived earlier than it in the tracked collection of plural queues. An arbiter/scheduler can thus automatically determine which packet is the earliest arriver and/or it can thus automatically determine relative order of arrival among competing packets of plural queues by inspecting the attached COE array values. The arbiter/scheduler can then make arbitration and/or scheduling decisions based at least on such relative orders of arrivals. Of course, the arbiter/scheduler algorithm may use numerous other factors to determine which of the competing packet(s) will ultimately be serviced ahead of others (e.g., allowed to depart from its given queue first) where these other factors may include extent of downstream congestion or extent of empty buffer space in downstream resources and priority of service indicators associated with the awaiting packets.

By using COE data arrays (Count Of Earlier-arrivals arrays), it is possible to reduce the number of bits needed for tracking order of arrival as compared to using convention time stamping. The COE's count whole numbers of packets (or of other predefined data blocks) as opposed to counting almost limitless units of small quantums of time. Since buffers have finite determinable sizes and packets have finite determinable minimum sizes, the number of bits needed to keep track of numbers of packets in each of plural queues can be much smaller than the number of bits needed by conventional time stamping for keeping precise track of times of arrival.

In one particular embodiment, the number of bits needed to keep track of arrival order is minimized. Each arriving packet—or other form of arriving data block entering a given one of plural queues—has attached to it just the CCAP of one other selected queue among the plural queues. The single attached CCAP provides order of arrival information as between the queue receiving the new packet and the other selected queue. The attached singular value (the COE) is decremented each time a packet departs from that selected other queue (or is expired at the departure gate of that other queue) but it is not decremented to a value below zero. A service-ready packet of this one particular embodiment with a singular COE count of zero (0) is understood to have arrived ahead of all packets in the other queue. If circular COE tracking is employed in this one particular embodiment where each of the plural queues tracks the departures of one unique other of the queues (e.g., the 2nd queue tracks the 1st, the 3rd tracks the 2nd, . . . , the 1st tracks the Nth queue) then a service-ready packet of this one particular sub-embodiment having a singular COE count of zero (0) is understood to have arrived ahead of all packets in all the other queues. More generally each attached CCAP from another queue provides 2-way information about the relationship between data in the two queues, namely, how many packets in the other queue are ahead of this newest packet of this queue and also the information that all afterwards arriving packets in this queue are behind (later arriving) the noted number of packets in the other queue. To have full information about relative ordering between queues, all unique permutations of relative arrival order need to be accounted for. Generally for keeping track of order of arrival among groups of 2 out of N queues, the number of unique permutations per the basic combination formula n!/k!(n−k)! is N ! /{(2!)(N−2)! (in other words, Nc2 which is N factorial divided by 2! and divided by (N−2) factorial) and thus a total of N !/(2!(N−2)!) count histories need to be maintained. More specifically, is there are only 2 queues being monitored, then one count history will suffice for indicating the relative arrival orders of packets as between the two queues. If there are 3 queues being tracked, then 3 count histories are needed (6/(2(1))=3). If there are 4 queues being tracked, then 6 count histories may be needed (24/(2(2))=6) and so on. Order determination among the n!/k!(n−k)! count histories (where k=2) may be determined with appropriate decoding including for example use of Karnaugh maps to detect ordering patterns.

In one particular embodiment, COE-based tracking is implemented in a network device (e.g., a packet router) that is structured to selectively dispatch to-be-egressed packet data to plural egress channels of potentially different bandwidths. An egress scheduler reads the attached COE values of packets awaiting dispatch from their respective queues (real or virtual) to corresponding egress channels (real or virtual) and uses the COE values as indicators of relative arrival orders. A service-ready packet that has a COE data array of all zeroes may be understood to have no packets that arrived ahead of it in the tracked other queues. A service-ready given packet that has a COE value of one may be understood to have at least one packet in another queue that arrived ahead of the given packet whose COE equals one. In one embodiment, the awaiting packet with COE=1 can have 2 or more other packets which arrived ahead of it due to the way the COE's are compiled in that particular embodiment. This will be detailed below.

In one embodiment, the number of bits used by the COE-storing registers (e.g., counters) or COE-storing memory fields which performing COE-tracking on behalf of a given packet of a given queue is equal to the smallest whole power of 2 whose corresponding value of 2 raised to that power is equal to or greater than the maximum number of shortest packets that can be stored at one time in any of the other queues whose CCAP's are being compiled to form the COE data array of the given packet. Thus, a relatively small number of COE counter bits (e.g., 8 bits to count as many as 255 earlier arriving other packets in another queue) may be used to keep track of arrival orders irrespective of the possible lengths of time (shortest to longest) between arrivals. In one embodiment, each collection of one or more COE-storing registers (counters) that performs tracking for a given packet has associated with it an index-storing register that stores a unique index number identifying the given packet whose COE data array is being kept by an associated one or more COE-storing registers (counters).

A packets transfer device in accordance with the present disclosure may be additionally configured to have data buffering FIFO's with programmably variable (elastic) FIFO depths for each of programmably re-configurable ports or communication channels so that FIFO depth may be efficiently tailored (e.g., reduced) to match the bandwidth needs of differently configured ingress and/or egress channels. The COE-based tracking of packet arrival order helps to reduce buffer size to less than what may be needed with conventional time stamping.

A machine-implemented method is provided in accordance with the disclosure for more efficiently utilizing packet dispatch resources by testing the COE's (Count Of Earliers-among-pending-packets-of-other-queues) of each of plural packets awaiting dispatch from other queues to thereby determine which packet arrived earliest into a plurality of competing queues. A dispatch arbiter uses the COE values as at least one factor in determining which one or more packets to next dispatch and/or otherwise service.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
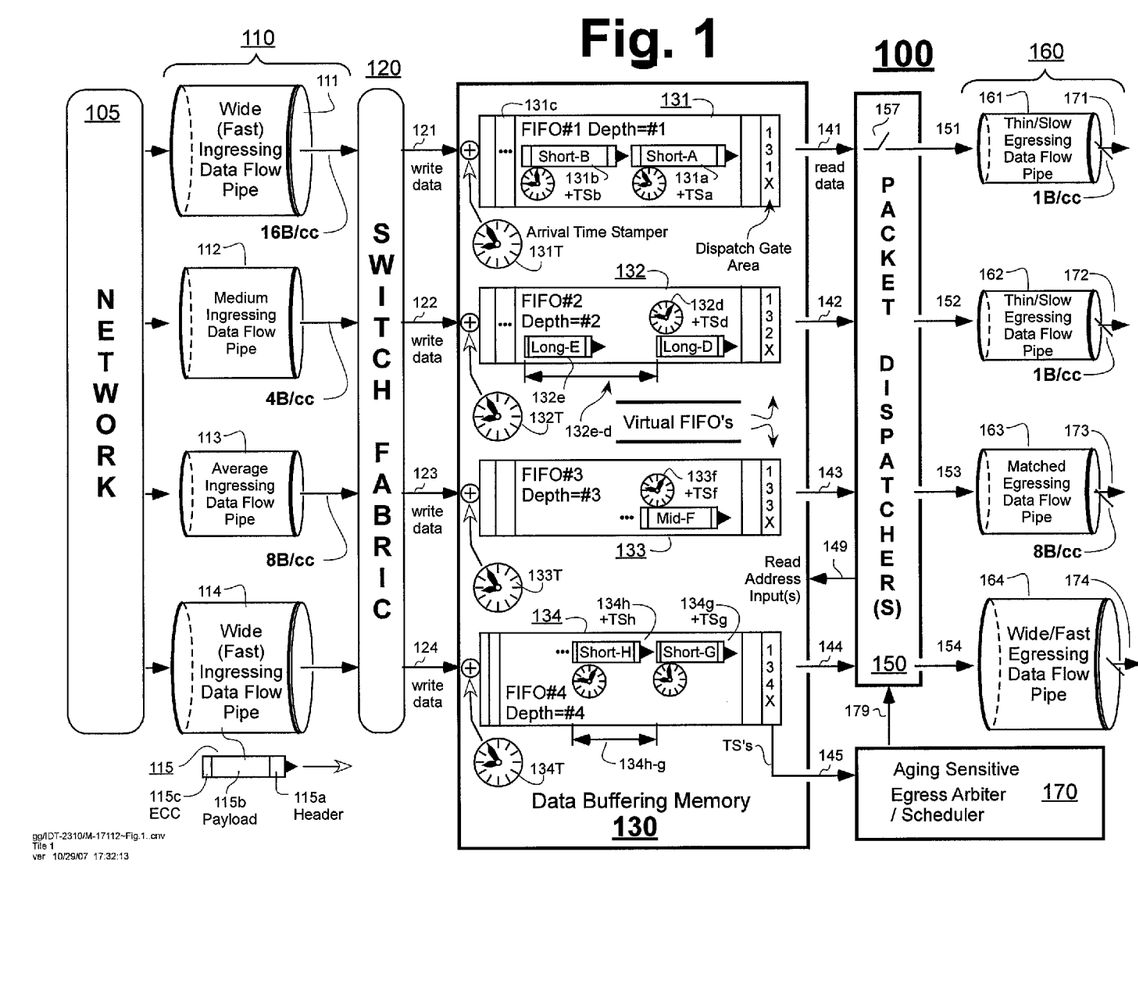
FIG. 1 is a block diagram of a first packet switching system having channel-servicing FIFO's for storing pre- or post-process packets that are about to be dispatched to egress channels of differing bandwidths, where packet aging is determined by use of attached time stamps.

Referring to a hypothetical first networked communication system 100 that is schematically illustrated in FIG. 1, seen under column 105 is a packet carrying network which is understood to be fed by a plurality of data sourcing devices including first through fourth data sourcing devices (not shown) which feed data into respective ingress pipes 111-114 of column 110. The first data sourcing device (the one feeding pipe 111) is understood to have a relatively large data output bandwidth —at least for the moment—while the second device (feeding pipe 112) is understood to have a relatively smaller or moderate bandwidth. In one example, the burst mode data output bandwidth of the first sourcing device (not shown) can be as high as 16 Bytes per clock cycle (16 B/cc) while the burst mode data output bandwidth of the second sourcing device (not shown) can be no higher than 4 B/cc. Others of the data sourcing devices (e.g., the ones feeding pipes 112, 113, etc.) are understood to have variable burst mode or steady state output bandwidths ranging from a possible minimum channel bandwidth (as defined by system protocols) to a possible maximum or widest channel bandwidth (as defined by system protocols). Just for purpose of example, the third ingress pipe 113 is shown as being fed by a data sourcing device of average bandwidth (e.g., 8 B/cc) and the fourth ingress pipe 114 is shown as being fed by a data sourcing device of relatively large bandwidth (e.g., 16 B/cc). The system is understood to allow for more channels than just the illustrative four and the narrowness of the thinnest pipes can be programmably varied to be substantially smaller than 1 B/cc by use of virtual port bifurcation. Moreover, various data stream routing paths through the network 105 can have different transmission latencies. Accordingly, even though a transmitted stream of packets or other kinds of data blocks may enter the ingress pipes layer 110 with a given burst-mode throughput rate (e.g., 16 B/cc), the actual arrival time may vary according to variable latency attributes of the network 105.

It is to be understood that FIG. 1 is merely illustrative. Although just one plurality of competing queues (e.g., FIFO's) 131-134 is shown in a block 130 that is interposed between switch fabric 120 and egress dispatcher 150, it is within the contemplation of the disclosure to have differently positioned or even multiple pluralities of such competing queues in a given device or system. For example an additional or alternate plurality of competing queues can be disposed upstream of the illustrated switch fabric 120. An additional or alternate arbiter/scheduler like 171 may be provided for this additional or alternate plurality of competing queues (not shown) and the COE-based tracking of packet arrival order may be employed for such an upstream plurality of competing queues (which compete for passage of their packets through switch fabric 120) in place of or in addition to the below described COE-based tracking of packet arrival order in the egress side set 130 of competing queues. Moreover, COE-based tracking of packet arrival order need not be limited to ingress and egress sides of a single plurality of queues. Packets may travel through a series of queues where arbitration occurs at the end of the series based on arrival order at the beginning of the series. In the latter case it may be necessary to attach a small identifier to each packet indicating what queue it initially arrived into at the beginning of the series and to count departures based on that first entry queue identifier. However the final result will be the same, namely, keeping track of which packet arrived ahead of which other packet at a defined line of entry within a multi-queues system.

Still referring to the ingress side (110) of FIG. 1, during a device reboot or reconfiguration operation, any of the ingress channels (pipes) 111-113—etc. in layer 110 can be programmably or fixedly reconfigured to have different throughput rates almost anywhere in the allowable spectrum of pipe bandwidths of the system between what may be considered a very small bandwidth (system minimum throughput rate) and very large bandwidth (system maximum throughput rate). Specific throughput rates may vary from application to application, or time to time. FIG. 1 is provided mostly for purpose of generically illustrating certain problems associated with networked switching systems where packets (or other data blocks) arrive from a distributed network 105 (e.g., having variable latencies) into plural queues (e.g., FIFO's) at different times and where keeping track of order of arrival is important because, for example, an automated arbiter and/or scheduler 170 further downstream is expected to fairly allocate servicing and/or egress time slots for the packets that earlier arrived into the plural and competing queues based, among other things, on packet arrival time within the initial holding queues 131-134—etc.

FIG. 1 also shows the employment of FIFO's 131-134—etc. of potentially different depths (programmably elastic storage capacities) given that the data sources or data pipes (111-114) feeding data into them can be of different burst-mode or average bandwidths and the data sinks or egress pipes (161-164) pulling data out of the FIFO's (under control by arbiter/scheduler 170) can also be of different burst-mode or average bandwidths. More specifically, the illustrated first egress pipe 161 is relatively thin (slow, e.g., 1 B/cc maximum) whereas an ingress pipe that could be currently feeding into corresponding FIFO 131 is relatively wide (fast, e.g., 16 B/cc maximum). As a consequence, it is assumed that the first FIFO 131 is programmably configured to be relatively long (have a large depth value, Depth=#1) in order to absorb the large number of packets that are expected to queue up in FIFO 131 as a result of the large mismatch between the peak possible ingress rate and the currently programmed and slow egress rate (171) at the output end. By contrast, it is assumed that another of the illustrated FIFO's, 133 is programmably configured to be relatively short (have a small depth value, Depth=#3) because its ingress and egress pipe throughput rates are well matched. In a system such as this where FIFO depths are adjusted to make efficient use of limited high speed storage space (e.g., buffering memory 130) it is additionally beneficial to use an arrival order tracking system which uses a minimal number of tracking bits per packet. It will be shortly shown that time-stamp based tracking (e.g., 131T) of relative arrival orders generally does not allow for minimization of tracking bits per packet.

It is to be understood that the ingress channels column 110 can represent aggregations of physical transmission media and/or logical bifurcations of logical (virtual) transmission pipes 111-114 (e.g., as might occur under the PCI-Express protocol for example) which pipes respectively conduct signals from respective data source devices of the network 105 to an ingressing-data side (data receiving side) of a switch fabric 120 and then to an egress side, of a data buffering memory area 130, where in the illustrated example memory area 130 contains the plural queues whose outputs compete with each other for a limited resource—e.g., dispatch through dispatcher 150. In practice the physical transmission media and/or logical data transfer pipes 111-114 will generally not have differing appearances and each may appear simply as a single coaxial cable or a single optical fiber or a high frequency transmission strip on a printed circuit board coupled to a physical media interface circuit followed by SERDES circuitry (serializing and de-serializing circuitry). In one embodiment, all the illustrated pipes 111-114 can be multiplexed over a single, bidirectional optical transmission line prior to being demultiplexed and de-serialized into parallel electrical signal flows. In order to graphically illustrate certain aspects, however, the transmission media/pipes 111-114 (which can be bidirectional media/pipes) are schematically shown as being separate wide, narrow or medium width data pipes for ease of understanding. Width indicates bandwidth in this schematic representation. Transmission pipe 111 is shown to be a relatively "fat" data flow pipe which means that pipe 111 can handle a relatively large bandwidth of incoming data, say at a rate of 16 Bytes per clock cycle. In contrast, transmission pipe 112 is shown as being a comparatively thinner data flow pipe which means that pipe 112 handles no more than the smaller bandwidth of incoming data, say at a rate of 4 Bytes per clock cycle. Similarly, transmission pipe 161 is shown as a narrow data flow pipe which means that egress pipe 161 handles no more than an even smaller bandwidth of data incoming into that pipe 161, say at a rate of 1 Byte per clock cycle. It is assumed for sake of example that switch fabric 120 is currently configured to route data such that all outflow from ingress pipe 111 goes into FIFO 131, all outflow from ingress pipe 112 goes into FIFO 132, and so on although in practice routing through the switch fabric 120 may be dynamically determined by self-routing data provided in each incoming packet. It is further assumed for sake of example that arbiter/scheduler 170 uses an arbitration/-scheduling algorithm that calls for order of arrival into memory 130 (in other words, who arrived first, second, etc. through the left side of box 130) as one of its input parameters.

Shown at 115 is an exemplary data packet having a header section 115a, a payload section 115b and an error checking and/or correcting section (ECC) 115c. It is to be understood that each of pipes 111-114, 161-164 carries digital data packets similar to 115 except that the specific structures, lengths and/or other attributes of packets in each pipe may vary from application to application. (For example, some packets may not include ECC sections like 115c.) Under some communication protocols, the source device (on the other side of network 105) first requests access through a network pathway that includes a corresponding ingress pipe (e.g., 113), sufficient vacancy room in a destination storage means (e.g., FIFO 131) and passage through the switch fabric 120 to the destination storage means. A domain controller (not shown) grants the request and the source device then streams a continuous sequence of packet data (for example, short packets 131a, and 131b carrying the source data) through the granted network pathway; and when finished, the source device relinquishes use of the pathway resources (e.g., 105, 113) so that other source devices (or reply-completion devices) can use the relinquished network resources for other operations. In the mean time, the FIFO-absorbed packets (131a-131b) sit in queue within the FIFO (e.g., 131) awaiting dispatch into (and/or other service prior to dispatch into) the respective egress pipe (e.g., 161) under control of the egress flow scheduler 170. It is generally undesirable to have packets piling up and waiting in a given queue for very long times, in other words, aging excessively without being dispatched. Under one paradigm, respective arrival time stamps (e.g., TSa, TSb) are physically attached to the incoming packets (e.g., 131a, 131b) as each finishes arriving (e.g., with no ECC error) into the ingress side of the FIFO (e.g., 131). The attached time stamps propagate through the FIFO with their respective packets until they reach a dispatch stage (e.g., 131X, or dispatch gate portion) of the FIFO and are thus ready for dispatch via a packet dispatcher circuit 150 to the destination egress pipe (e.g., 161). Passage through the dispatcher 150 and the downstream pipe (e.g., 161) may be limited due to numerous factors including for example the finite bandwidths of one or both of these downstream circuits (e.g., by the time slots allocating switch 157 and the pipe 161) and/or by buffer congestion further downstream. The egress flow scheduler 170 reads the time stamp values (TS's via data read line 145 for example) of the packets awaiting in dispatch gates 131X-134X of the respective queues 131-134 to determine which of these packets is the oldest and thus arrived ahead of all the other service-ready packets and is thus perhaps more deserving of next dispatch through dispatcher 150 due to its accumulated time waiting in the queue or its relative place in line as being first to arrive into memory 130. The egress flow scheduler 170 may of course use a complex arbitration algorithm for determining which of competing packets at the dispatch gates (e.g., 131X-134X) wins, where packet arrival order and/or packet aging may or may not play a predominant role. For example, some less aged packets in one queue may have a much higher priority than the most aged of the awaiting packets in another queue and the higher priority packets may thus be awarded earlier dispatch even though they did not wait the same amount of time in memory 130. Nonetheless, the time stamps (TSa-TSg) will be used for example, when packets of equal priority compete and service is then on a first come, first served basis. Accordingly, storage space in the memory buffer 130 or elsewhere must be provided for physically or logically attaching the arrival time stamps (TSa-TSg) to their respective packets.

In discussing memory 130, it is to be understood that buffered packets (e.g., 131a-134h) do not necessarily travel physically through respective FIFO structures 131-134 with their attached time stamps moving along with them. Instead, FIFO structures 131-134 may be implemented as circular buffers with rotating pointers defining their respective receive and dispatch areas. Data packets (e.g., 131a-134h) that are received from the respective ingress pipes 111-114 appear at a data-input side of memory region 130 as respective write data flows 121-124. Routing means (other than 120, not shown) may be optionally provided within the ingress data buffering memory 130 for directing respective data flows 121-124 to specific kinds of FIFO buffers 131-134 within memory region 130. For example, in the PCI-Express system there are specialized packet types known as posted (P), non-posted (NP) and completion (CT) packets. The internal routing means (not shown) may route each kind of packet to a respective FIFO for that kind of packet as well as generally causing first write data 121 to be stored in general FIFO area 131, second write data 122 to be stored in general FIFO area 132 and so on. In accordance with a more conventional FIFO configuration scheme, each of FIFO's 131-134 has a same data width (bits per storage location) and a same depth (total storage capacity). Alternatively, in accordance with the above cited and co-pending patent application (Ser. No. 11/390,754), each of FIFO's 131-134 is a virtual FIFO with a variable memory capacity (e.g., elastic depth) that adaptively conforms at least to the bandwidth of a specific ingress pipe 111-114 or egress pipe 161-164 serviced by that FIFO.

In the case where FIFO depth is elastic, since FIFO 131 is outputting to a relatively thin pipe 161, FIFO 131 will automatically be allocated a relatively large depth (Depth #1) and consume much of memory space 130. By contrast, the illustrated FIFO 134 that is outputting to a relatively wide (fast) pipe 164 will be automatically allocated a relatively short depth (Depth #4) and thus consume less memory. This elastic FIFO depth scheme allows for more efficient use of the finite memory resources of buffering memory 130. However, the conventional time stamping scheme can disadvantageously consume large amounts of memory space because each time stamp (TSa, TSb, etc.) has to consume a large number of bits.

To understand why, consider first the case shown in FIFO 131 where a large number of relatively short packets (each having a small payload) quickly pile up in that FIFO 131, where that pile-up occurs because the source pipe (e.g., 111) is relatively wide and the egress pipe 161 is substantially thinner. The shortness of short packets 131a, 131b, etc. is generally a function of their data source at the other side of the network 105. However, for some types of communication protocols such as PCI-Express, length of packet may also be a function of message type. For example, data layer DLLP packets that carry receipt acknowledgement ACL's or NAK's tend to be relatively short. Completion packets tend to be relatively short. Given that packets 131a-131b—etc. are all short and arrive quickly one behind the other in this example, the difference between their respective arrival times and thus the difference in value between their respective time stamps (e.g., TSb minus TSa) will be fairly small, thus calling for fine resolution of time differences. In other words, the arrival time stamper 131T that generates those time stamps must be able to resolve timing differences to the smallest value possible between the shortest and fastest incoming packets in the case where they arrive into plural queues one immediately after the other.

By contrast, the example shown for FIFO 132 is the case where received packets 132d and 132 are very long and the source pipe (e.g., 112) that supplies them is relatively thin. As a consequence, the arrival time stamper 132T that services FIFO 132 and generates its time stamps may have to resolve timing differences to the largest value possible between the longest and slowest arriving of the packets in the case where they arrive into different queues very far apart, one from the other due to slowness of ingress side pipes (e.g., 112).

In theory, there is no limit on how far apart or how close together the arrival times are of successive packets entering through the left side of memory 130 into plural queues. The time span between successful arrivals can be a very small number or a very large number. Storing such a wide range of numbers accurately generally calls for a memory of almost infinite size. Infinite size is of course not possible. So designers have to compromise and pick a realistically large bit length for the memory fields or registers that store the respective time stamp values (e.g., TSa-TSh) of each of the numerous packets that can accumulate in memory 130. Since the picked bit length is finite, there may be times when the bit length is too small to account for a larger span 132e-d between packets (e.g., 132d, 132e) that arrive far apart. There may be times when the bit length is too small to account for a consequence of counter rollover (e.g., wrapping around from FFFF back to 0000) when a digital time stamp value is subtracted for example from the current time counter (e.g., 131T). As a result of unexpected counter rollover, the egress flow scheduler 170 may be fooled into making incorrect scheduling decisions. For example, if the current clock count rolls over beyond its max count (from all FF's in hex to all 0's) then a subtraction of current time minus recorded arrival time of very old packets may generate an indication that they are newly arrived instead of having arrived shortly after a yet earlier clock roll over. So very aged packets may be erroneously bypassed while younger, later arrived packets may be unfairly serviced first.

Additionally, because comparison for earliest time of arrival is across all queues 131-134—etc. of memory 130, a same large bit length for time stamps must be allocated to every FIFO; even to FIFO 131 in the case where it stores many close together arriving short packets (e.g., 131a-131b—etc.) whose differences in time of arrival may be small. As a result, large amounts of memory space may be wasted by the need for large time stamp fields for each of numerous numbers of short packets.

FIG. 1 may be somewhat misleading in that dispatch paths 151-154 do not have to be separate paths. In one embodiment, dispatch paths 151-154 multiplex through a common dispatch bus having for example, a 16 B/cc maximum bandwidth. The dispatcher(s) can only dispatch one data block at a time over this common dispatch bus (not shown). The scheduler 170 may pick out the longest running of pending egress streams as a primary dispatch job and then the scheduler 170 may try to fit other pending egress jobs into whatever slack time may be left over by the primary dispatch job. So for example, if the dispatch job associated with FIFO 132 has been designated as the primary dispatch job (at the 1B/cc average dispatch rate) because FIFO 132 contains a long stream of high priority packets 132d-132e, that does not preclude shorter packets (e.g., 131a) from being simultaneously dispatched with slack time slots through from respective others of the egress pipes even as the long job slow dribbles out through its narrow discharge outlet 172. Packets of the primary dispatch job (e.g., FIFO 132) do not necessarily have to be "long" packets. Packets of a threaded-in secondary job (e.g., that of interlacing transmission of packets 134g, 134h from FIFO 134) do not necessarily have to be comparatively "shorter" packets. These examples are picked simply for amplifying the problem that would evolve if the scheduler 170 limited itself to allowing only one stream to dispatch at a time on an exclusive basis. The main point is that by allowing multiple jobs to dispatch simultaneously, according to aging as well as priority, the scheduler 170 can keep the dispatcher(s) 150 and the FIFO memory unit 130 busy for as much of the available time as is possible or practical by detecting slack time slots in the dispatching of the primary dispatch job (e.g., FIFO 132) and by determining what additional secondary dispatch jobs can be squeezed in to take advantage of the available slack dispatch bandwidth. Once a first primary job assignment (e.g., that in FIFO 132) completes, the scheduler 170 may find a next still ongoing or pending dispatch job (e.g., that of FIFO 133) to be designated as the new primary dispatch job. The scheduler 170 then tries to opportunistically fill the holes of slack times of that new, primary dispatch job with secondary dispatch jobs.

Figure 2A:
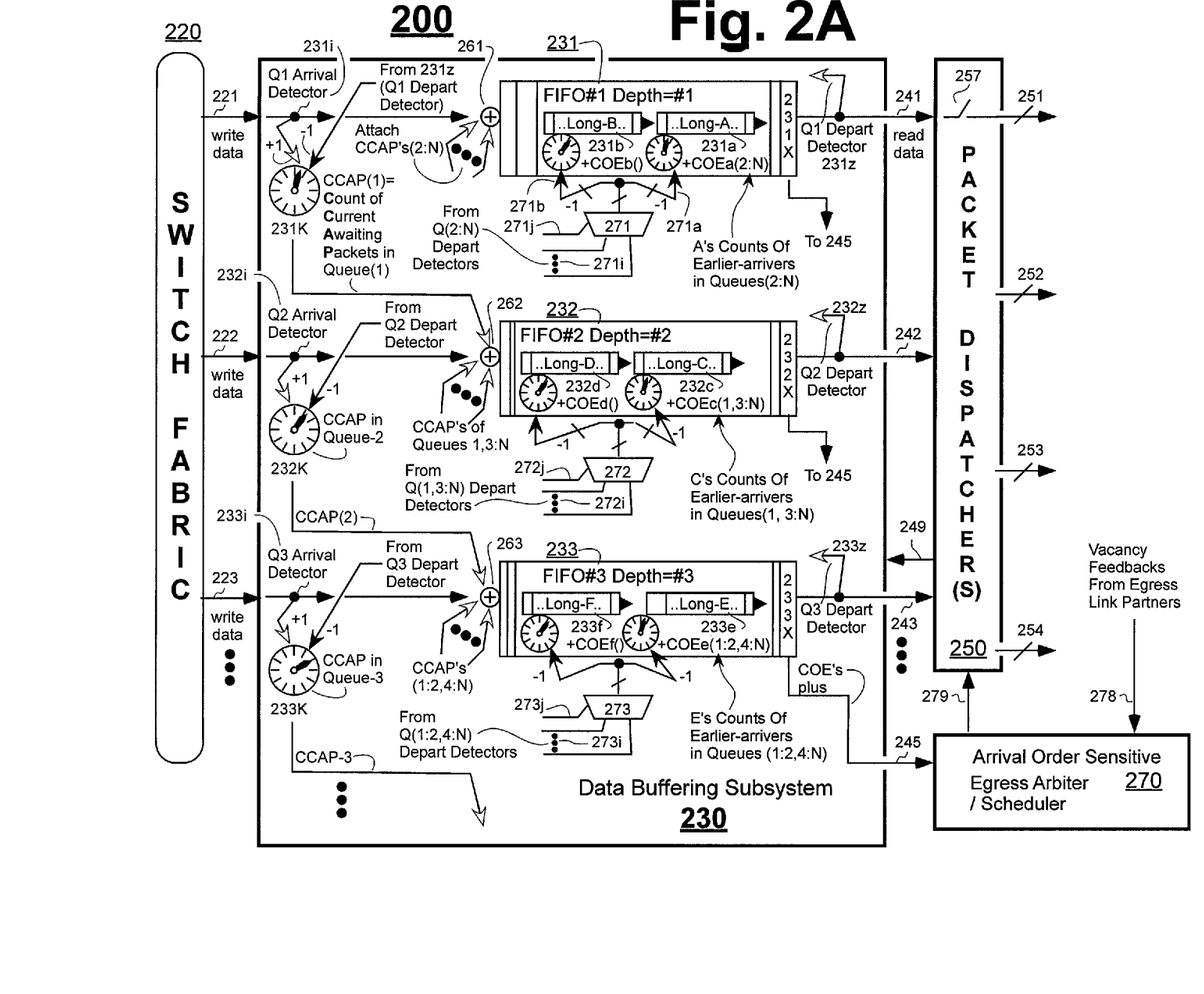
FIG. 2A is a block diagram of part of a second packet switching system, similar to that of FIG. 1 except that order of packet arrivals in the plural competing FIFO's is determined by use of attached COE counters.

Referring to FIG. 2A, shown is a portion of a system 200 similar to system 100 of FIG. 1 except that the network 105, ingress pipes 110 and egress pipes 160 are not shown. It is to be understood that such variable bandwidth transmission means may nonetheless be present in a network communicating device that includes the illustrated portion 200. It is also to be understood that where practical, reference numbers in the 200 century series are used in FIG. 2A to represent alike elements of FIG. 1 having reference numbers in the 100 century series. As such a description for the general FIFO structures will not be repeated.

Unlike the time stamps used in system 100, the improved buffering system 200 of FIG. 2A uses counts of pending packets in each FIFO to keep track of arrival order. More specifically, the first FIFO 231 has associated with it a first counter 231K that keeps count of the number of pending-packets stored in FIFO 231 that have fully arrived (e.g., safely into FIFO 231, that is, with a good ECC if such a good ECC is needed to get loaded into the FIFO) but have not yet been fully dispatched to a link partner (e.g., safely copied out of FIFO 231 with an acknowledgement, e.g., a DLLP ACK, having been received from the link partner of safe receipt of the packet). Associated with the first pending-packets counter 231K is a corresponding arrivals detector 231i (for queue number Q1) that detects completed good arrivals of new packets into the ingress side of FIFO 231 and a corresponding departures detector 231z (for queue number Q1) that detects completed good departures of dispatched packets from the egress side of FIFO 231. The first pending-packets counter 231K is incremented (+1) with each detection by the Q1 arrivals detector 231i of a new well-arrived packet and it is decremented (−1) with each detection by the Q1 departures detector 231z of a packet successfully dispatched from FIFO 231. In one embodiment, the pending-packets counter 231K stops decrementing when it hits a zero count and it resets to zero when FIFO 231 is reset.

The second FIFO 232 similarly has associated with it a second pending-packets counter 232K which keeps track of the number of packets stored in FIFO 232 that have been fully received but not yet dispatched out safely to a link partner. Likewise, the third FIFO 233 has a third pending-packets counter 233K which keeps track of the number of packets stored in FIFO 233. Associated with the second and third pending-packets counters 232K-233K are respective Q2 and Q3 arrivals detectors 232i and 233i that detect completed good arrivals of new packets into the ingress sides of their respective FIFO's 232-233. Further associated with the second and third pending-packets counters 232K-233K are respective Q2 and Q3 departures detectors 232z-233z that detect completed good departures of dispatched packets from the respective egress sides of FIFO's 232-233 to respective link partners. If there are yet further, fourth through Nth queues in memory subsystem 230 (not shown), these too are associated with respective pending-packets counters 234K-23NK (not shown). The respective counts of the first through Nth pending-packets counters 231K-23NK (last one not shown if N>3) are output as respective signals, CCAP(1) through CCAP(N) where CCAP is short for Count of Current Awaiting Packets in the enumerated queue (1 through N).

When a new packet arrives into the first FIFO 231, the corresponding first pending-packets counter 231K is incremented (+1). Additionally, the newly received packet (e.g., 231a) is bound to a COE data array (e.g., either physically by appending the COE array to the packet or logically by logically associating the specific COE array with the received packet) where the so-attached COE data array (e.g., COEa(2:N) of packet 231a) indicates the respective current CCAP values of all other queues (2 to N inclusive) except that (CCAP(1)) of the first FIFO 231. Array forming unit 261 is understood to generate the COE data array signal (e.g., COEa(2:N) for packet 231a) and to directly or indirectly cause the generated COE data array signal to remain bound (physically or logically) with its associated packet as the packet advances physically or logically through the FIFO. COE is short of Count Of Earlier-arrivers, where in the case of FIG. 2A it is a count of earlier-arrivers in each of the other queues (e.g., Q2 to QN inclusive) except that of the respective FIFO (e.g., CCAP(1) of FIFO 231). In one embodiment, the COE data array is stored in an array of counters (e.g., 2:N, not individually shown) that are logically associated with the corresponding packet for which the COE is kept. (See for example the COE1.z counter of FIG. 3B.) In an alternate embodiment, each COE's-storing array (set of counters) is a stage within a large serial shift register (not shown) whose stages can shift stored data (physically or virtually) from one stage to the next as corresponding packets advance (physically or virtually) forward in the corresponding queue (e.g., 231) so that the output stage of the shift register holds the COE array of the packet awaiting dispatch from the departure gate (e.g., 231X) of its respective queue. In one embodiment, if a given queue (say 231) is completely empty and there are no packets stored in it, then the count (COE) in its departure gate is artificially forced to a large number (e.g., all 1's or FFFF in hex) to indicate that the information in the departure gate (e.g., 231X) is not an early arrived packet but rather no packet at all. If all queues are empty, then all their departure gate COE counts are artificially forced to the large number (e.g., all 1's or FFFF in hex) to indicate that the information in the respective departure gates (e.g., 231X-233X) does not represent an early arrived packet.

Similar to the case of queue 231, when a new packet arrives into the second FIFO 232, the corresponding second pending-packets counter 232K is incremented. Additionally, the newly received packet (e.g., 232c) is bound to a respective COE data array where that so-attached COE data array (e.g., COEc(1,3:N) of packet 232c) indicates the then current set of CCAP signals of all other queues (1,3:N) except that (CCAP(2)) of the second FIFO 232. Array forming unit 262 is understood to generate the COE data array signal (e.g., COEc for packet 232c) and to directly or indirectly cause the generated COEc signal to remain bound (physically or logically) with its associated packet 232c as that packet advances in its queue. Similar array forming structures 263-26N (last not shown for N>3) apply for the third through Nth FIFO's 233-23N (where the Nth one is not shown for case of N>3).

When a pending packet in departure area 231X of the first FIFO 231 departs and/or is acknowledged to have been correctively received by the egress side link partner (which acknowledgement means it is now safe to remove the packet from the departure area), the corresponding first pending-packets counter 231K is decremented. Additionally, the Q(1) field in each of the COE data arrays that have such field (COEb of FIG. 2a does not) are also decremented. This decrementing operation is carried out in FIG. 2A by, for example, COE decrementing updaters 272-273. Each COE decrementing updater (e.g., 271) has N−1 parallel output lines that are reset to '0' by default and are temporarily set to '1' when a packet departure has been detected by the corresponding departure detector (e.g., 232z) of a respective queue (2:N). In one embodiment, the COE decrementing updater (e.g., 271) has an addressing control input (e.g., 271i) that points its N−1 parallel output lines towards first selectively decrementing (−1) the COEa(2:N) registers of a first packet, then the COEb(2:N) registers of a second packet, and then pointing further towards the front end of FIFO 231 so as to selectively decrement the appropriate COE field in each COE data array so as to reflect the latest packet departure(s), if any, out of one or more of other queues 2 through N (2:N). In this way, each COE field indicates how many earlier arrivers that are still valid remain in the respective other queue (e.g., 2:N) where that earlier arriver packet arrived before the logically bound packet (e.g., 231b) and was still pending when the logically bound packet (e.g., 231b) arrived in its queue (e.g., 231). While the example of COE decrementing updaters 272-273 given in FIG. 2A calls for a sequential address scanning form (in other words, selectively updating the COE data array of the oldest pending packet in the FIFO first, and then the next oldest packet, and so on), it is within the contemplation of the disclosure to use other forms of selective updaters including those that update all the COE data arrays of pending packets in the FIFO at a same time—in other words, in parallel). The point is that the COE data array of each respective packet keeps track of how many earlier arrivers still remain in each of the other queues.

Although in one class of embodiments the COE data array replaces totally the per packet time stamps, this is not true for all embodiments. In one other class of embodiments, it is necessary under the protocol to keep track of excessively aged packets and to invalidate them out of the queue. However, the time-out invalidation does not have to be a precise one that invalidates an overly-aged packet at the very microsecond (or nanosecond) it becomes too old. Invalidation due to excess age can be done crudely, say to a resolution of no better than 10 ms to 25 ms. Thus only a few more significant bits from the local time clock may be attached logically or physically to each arriving packet as it arrives as opposed to tagging each entrant into a given queue with a time stamp of much greater resolution (sufficient resolution to track order of arrival). Accordingly, even when a crude time stamp is attached to each packet for purpose of detected overly long residence in a queue, the COE data array technique generally still works to reduce the number of bits per packet used for tracking order of arrival.

One additional point: if crude time out expirations are used for excessively aged packets, the departure detectors (e.g., 231z-233z) treat packet invalidation due to aging as if the invalidation were a departure and the appropriate CCAP count is decremented in response to invalidation of an in-queue packet.

In terms of a more specific example, assume for one version of FIG. 2A that N=3 and that, at the time packet 233f freshly arrives in its respective queue 233, there are 5 packets still pending in queue 233, 6 packets still pending in queue 232 and 7 packets still pending in queue 231. Array forming unit 263 responsively generates a COE data array, COEf(1:2) for the packet 233f having just two COE fields; one indicating that there were 6 earlier arrivers in queue 232 and another indicating that there were 7 earlier arrivers in queue 231. If 3 packets then depart from queue 232 and 2 packets depart from queue 231 while packet 233f has not yet departed, the COE decrementing updater 273 will automatically cause the fields in array COEf(1:2) to indicate that there are still 3 earlier arrivers pending in queue 232 and 5 earlier arrivers pending in queue 231. When packet 233f advances into FIFO departure gate 233X, its COEf(1:2) array of this example; or COEf(1:2,4:N) array in the general example where N>3; will show how many packets remain in each of respective FIFO's (1:2,4:N) where those packets were pending ahead of packet 233f. This allows the egress arbiter or scheduler 270 (described below) to determine the relative arrival orders of all packets awaiting dispatch in departure gates 231X through 23NX.

The case of N=3 is a special one because under the constraint of the number of tracked queues being N=3, there is only a short list of possible states in terms of packet arrival time: '000', '011' and '012'. The '000' state represents the case where three packets arrived simultaneously at queues 231-233 and the same three packets later show up simultaneously at departure gates 231X-233X. Each of the three has a COE array reporting that there are zero (0) earlier arrivers in the other two queues, this condition across all three queues being denoted here as '000'. The other possible tie is when one packet arrives first in a first queue and the second plus third packets arrive simultaneously in the second plus third queues; and later the same order appears at the departure gates; this condition across all three queues being denoted here as '011'. Each runner-up reports that there is only one packet ahead of it. Finally there is the possibility that packets one through three arrived in respective first, second and third order; this condition across all three queues being denoted here as '012'. In the N=3 situation, if each queue keeps count of just one unique other of the queues, sufficient information is present at the three departure gates for determining if the current state is '000', '011' or '012' and which gate has a first place, second place and/or third place packet. In the case where N=4, the number of possible permutations becomes larger: '0000', '0003', '0022', '0111', . . . , '0123'. It can be shown that the minimum number of other queues that each queue must keep track of in order to fully determine order of arrival across the departures gates of all N queues is roughly $(N!)/(2*(N-2)!)$.

As mentioned, in one embodiment, each COE field is held by a respective hardware counter of predefined bit length where that bit length (e.g., BL1 of FIG. 3B) is at least equal to the smallest whole power of 2 whose corresponding value of 2 raised to that power is equal to or greater than the maximum number of shortest packets that can be stored at one time in any of the queues whose CCAP's are being tracked by the given COE field counter. The bit length of the COE field counter can of course be bigger. By way of example, assume that each of FIFO's 231-23N can store no more than 15 of the shortest possible packets storable in those FIFO's. In such a case, only 4 bits are needed per COE field counter and the total number of storage bits consumed by each COE data array having (N−1) fields is therefore (N−1) times 4. In one embodiment, each COE field counter stops decrementing when it hits a zero count (bottoms out at zero). In one embodiment, each COE data array has associated with it an index register that holds a unique index value which identifies the packet for which the COE data array is maintaining a tracking of remaining earlier arrivers in the other queues. The bit length (e.g., BL2 of FIG. 3B) of the index-holding register need not be greater than the maximum number of bits needed for uniquely identifying the maximum number of packets storable in the given queue of the associated COE data array. An index table (not shown) may be included in the network device 200 for storing a start of frame address (SOF) corresponding to each index value where the SOF address indicates where in memory 230 the corresponding packet resides.

As a result of the above operations, when a plurality of packets of different queues wait in the respective departure gates 231X-23NX of their respective FIFO's 231-233-23N for permission to depart (and/or scheduling of when to depart) from arbiter/scheduler 270, the arbiter/scheduler 270 can read the current COE data arrays of the ready-to-depart packets (via read line 245) and can determine therefrom which of the packets awaiting in the departure gates arrived first, which second and so on relative to one another. Assuming no tie, the oldest of the awaiting packets will have a COE data array filled with zeroes, meaning that no other queue has any packets that arrived earlier and was still valid and pending when the given packet arrived. The next oldest of the awaiting packets (again, assuming no ties) will have a COE data array with just one COE field equal to one, that field being the one corresponding to the queue holding the oldest of the awaiting packets. The third oldest of the awaiting packets will have a COE data array with either two COE fields each equal to one or one COE counter field set to two, those set fields being the one(s) corresponding to the queues or queue holding the oldest and next oldest of the awaiting packets. And so forth. The arbiter/scheduler 270 may then make arbitration and/or scheduling decisions as a function of at least of data read from the COE data arrays (read via bus 245) and it may control (via control line 279) the packet dispatcher(s) 250 to dispatch selected ones of the awaiting packets from their departure gates (231X-23NX) to their respective egress pipes in accordance with dispatch arbitration and/or scheduling decisions made by the arbiter/scheduler 270 in accordance with a predefined arbitration and/or scheduling algorithm that is programmably stored in the arbiter/scheduler 270. In one embodiment, the arbitration and/or scheduling algorithm stored in the arbiter/scheduler 270 can be changed on the fly and may be made responsive to, or nonresponsive to, the available COE data array values (readable via bus 245) in accordance with the desires of the system designer.

In one embodiment, the arbiter/scheduler 270 receives vacancy feedback data 278 (e.g., buffer slack counts or backpressure flags) from the downstream link partners of the associated egress pipes (not shown, see instead 160 of FIG. 1) and the arbiter/scheduler 270 then makes its arbitration and/or scheduling decisions as a function of the vacancy feedback data 278 as well as a function of the read COE data array values. In one embodiment, the vacancy feedback data 278 is sent from the link partners within packets traveling from the link partners to the network device 200 of the given arbiter/scheduler 270.

Figure 2B:
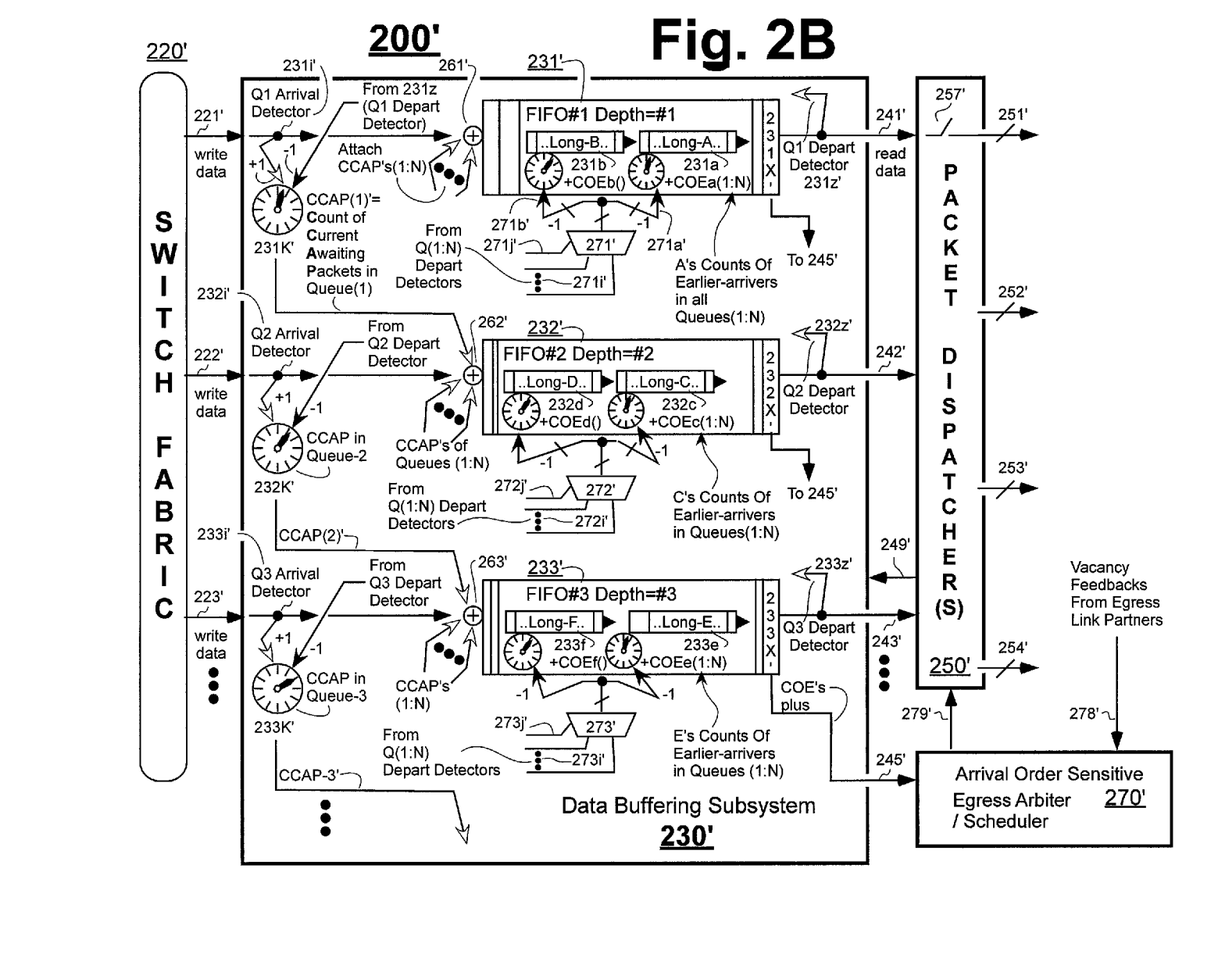
FIG. 2B is a block diagram of part of a third packet switching system, similar to that of FIG. 2A except that the COE counters of each queue are initially loaded with the CCAP's of all queues.

Referring to FIG. 2B, shown is part of a third packet switching device 200' similar to that (200) of FIG. 2A except that the COE data arrays of each packet in each queue have the same number of COE counter fields, denoted as 1 through N. This version is generally wasteful of storage space. It is wasteful because there will be one COE counter field in each COE data array (e.g., COEc(1:N) of packet 232c) that will always read 0 when its packet (e.g., 232c) reaches the departure gate (e.g., 232x') of its FIFO. This will be so because there will be no packets in that same queue ahead of the departure-ready packet (e.g., 232c). However the storage wasting embodiment of FIG. 2B has the advantage that each of array forming units 261'-263'-26N' (last not shown) can be structured the same way and each COE decrementing updater 271'-273'-27N' (last one not shown) can be structured the same way (e.g., with N parallel output lines) since all departure detections (231z'-23Nz') from all queues are being responded to with an update operation.

When a given packet (e.g., 232c') enters the one-at-a-time departure gate (e.g., 232x') of its respective queue (e.g., 232') in FIG. 2B, the associated COE data array of that packet will still indicate how many packets in the other queues arrived ahead of the given packet and where pending at its time of arrival. As mentioned, there will be no packets in the respective queue (e.g., 232') ahead of that ready-for-departure packet (e.g., 232c'). However, when the given packet (e.g., 232d') is further back in its respective queue (e.g., 232') in FIG. 2B and has not yet entered the departure gate (e.g., 232x'), its associated Count Of Earlier arrivals (e.g., COEd(1:N) will also indicate a nonzero value representing the number of earlier arrivers and still pending packets in its own same queue (e.g., 232') that arrived ahead of the given packet (e.g., 232d'). It is understood that the COE decrementing updaters (e.g., 271-27N, 271'-27N' of FIGS. 2A-2B) can be structured to handle the case where only one packet can be dispatched at a time through the dispatcher unit 250/250' or they can be structured to handle the case where multiple packets can be dispatched at a same time from different departure gates and through the dispatcher unit 250/250'. If more than one packet can be dispatched at a same time from a same queue, then a more complex accounting circuit may be needed in the COE updaters 271-27N (rather than a simple −1) to keep track of how many packets depart during each associated time slot and to debit all the associated COE counter fields accordingly for each associated time slot.

Figure 3A:
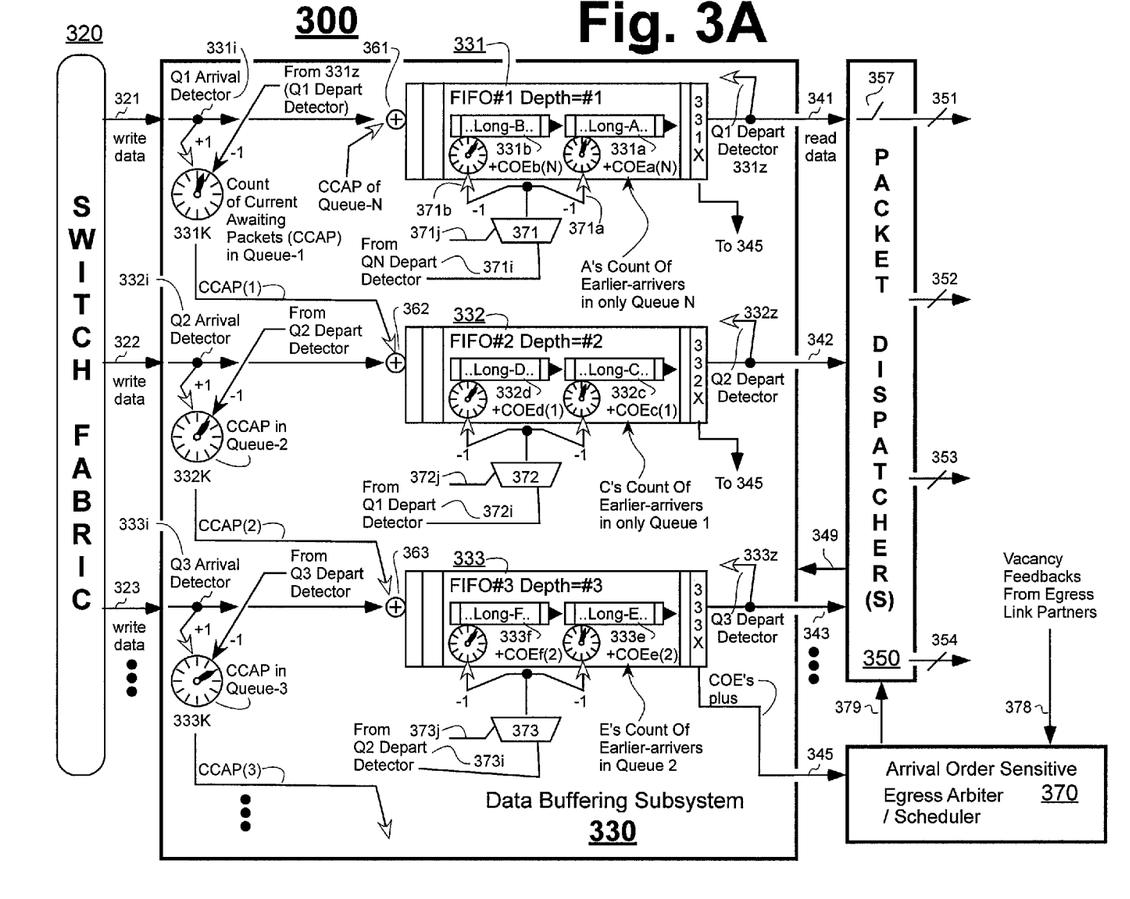
FIG. 3A is a block diagram of part of a fourth packet switching system, similar to that of FIG. 2A except that the COE counters of each queue are initially loaded with the CCAP of just one other competing queue.

Referring to FIG. 3A, shown is part of a packet switching device 300 similar to that (200) of FIG. 2A. It is to be understood that where practical, reference numbers in the 300 century series are used in FIG. 3A to represent alike elements of FIG. 2A having reference numbers in the 200 century series. As such a description for the general FIFO and other illustrated structures will not be repeated. In FIG. 3A, the COE counters of each queue are initially loaded with the CCAP signal from just one corresponding other of the competing queues. In one embodiment, the linkage of the COE counters each to the CCAP signal from just one other of the competing queues is done on a circular basis. By way of example, the COE's of the first queue 331 are each initially loaded with the current CCAP signal (CCAP(N)) of the Nth queue (not shown) when those COE's are generated and associated with corresponding packets (e.g., 331a, 331b, etc.) entering the first queue 331, the COE's of the second queue 332 are each initially loaded with the current CCAP signal (CCAP(1)) of the 1st queue 331 when those COE's (e.g., COEc, COEd, etc.) are generated and associated with corresponding packets (e.g., 332c, 332d, etc.) entering the second queue 332, the COE's of the third queue 333 are each initially loaded with the current CCAP signal (CCAP(2)) of the second queue 332 when those COE's (e.g., COEe, COEf, etc.) are generated and associated with corresponding packets (e.g., 333e, 333f, etc.) entering the third queue 333, and so on. Moreover, the COE's of the first queue 331 are decremented by updater 371 in response to departure detections by the QN departure detector (33Nz, not shown), the COE's of the second queue 332 are decremented by updater 372 in response to departure detections by the Q1 departure detector 331z, and so on. In one embodiment, COE updaters 371, 372, . . . , 37N are replaced by wires extending to the decrement command lines of all COE counters in the respective FIFO since there is no need for selective updating. There is just one COE counter field per packet in this embodiment.

The examples of FIGS. 2B and 3A represent ends of a wide spectrum of other possible implementations. In FIG. 2B each COE data array of each pending packet keeps track of how many earlier arrivers (still pending ones) remain in each of the N FIFO's. In FIG. 3A each COE data array (actually just one counter) of each pending packet keeps track of how many earlier arrivers (still pending ones) remain in one corresponding other of the N FIFO's. In an alternate embodiment, updaters 271, 272, . . . , 27N may have programmably activatable inputs which can be individually selectably forced into a zero state rather than receiving the departure detection signal of a corresponding one of departure detectors 231z through 23Nz. Furthermore in the alternate, programmably modifiable embodiment, CCAP signal collecting nodes 261-26N (last one not shown) have programmably activatable inputs which can be individually selectably forced into a zero state rather than receiving the current CCAP signal of a corresponding one of counters 231K-23NK (last one not shown). Such a programmable structure allows users to determine which of one or more of the other queues, if any, the COE data arrays of a given queue will track.

Assuming the case of FIG. 3A where the COE's of first queue 331 track the number of earlier arrivals in only the Nth queue (not shown), and the COE's of second queue 332 track the number of earlier arrivals in only the 1st queue 331, the COE's of third queue 333 track the number of earlier arrivals in only the 2nd queue 332, and so forth, when a given packet (e.g., 333e) of the third queue 333 enters the one-at-a-time departure gate (e.g., 333x) of its respective queue, the associated COEe of that packet (e.g., 333e) will indicate how many packets only in the 2nd queue 332 arrived ahead of the given packet (e.g., 333e). Similarly, when a given packet (e.g., 332c) of the second queue 332 enters the one-at-a-time departure gate (e.g., 332x) of its respective queue, the associated COEc of that packet (e.g., 332c) will indicate how many packets only in the 1st queue 331 arrived ahead of the given packet (e.g., 332c), and so on. The arbiter/scheduler 370 can read the current COE data arrays of the ready-to-depart packets (via read line 345) and can determine therefrom which of the awaiting packets in the departure gates (331X-33NX) arrived first, which second and so on. In a fully circular daisy chained interconnection scheme, assuming there are no ties allowed for arrivals, only one departing packet can have zero packets ahead of it and thus it is the oldest. If a fully circular daisy chained interconnection scheme is not used for the COE generators (361-36N) because, let's say generator 361 is not programmably coupled to receive the CCAP(N) signal; then the oldest of the departure-awaiting packets may be deemed to be the one residing in the highest numbered queue where its departure COE value is equal to zero, this meaning (assuming the connection permutation shown in FIG. 3A is used with CCAP-N to 361 broken open) that no other packet among the queues arrived earlier. If on the other hand, there is also a departure-awaiting packet residing in a lower numbered queue, its associated COE can also be equal to zero; but that zero merely indicates that no packet in the stack of queues above it (if it is not a circularly-wise daisy chain connected stack) arrived earlier. as mentioned, if a circularly connected daisy chain of queues is used then only one queue can have a departure COE equal to zero. On the other hand, if there is a departure-awaiting packet in FIG. 3A whose associated COE is equal to one, that does not necessarily mean that only one packet in just one other queue arrived earlier. This is so because the earlier arrived one packet of the next daisy-chain wise connected queue can have other packets ahead of it in yet another queue and the last of those can have further packets ahead of it, and so on. Thus a one count does not necessarily mean there is only one packet that arrived earlier.

Figure 3B:
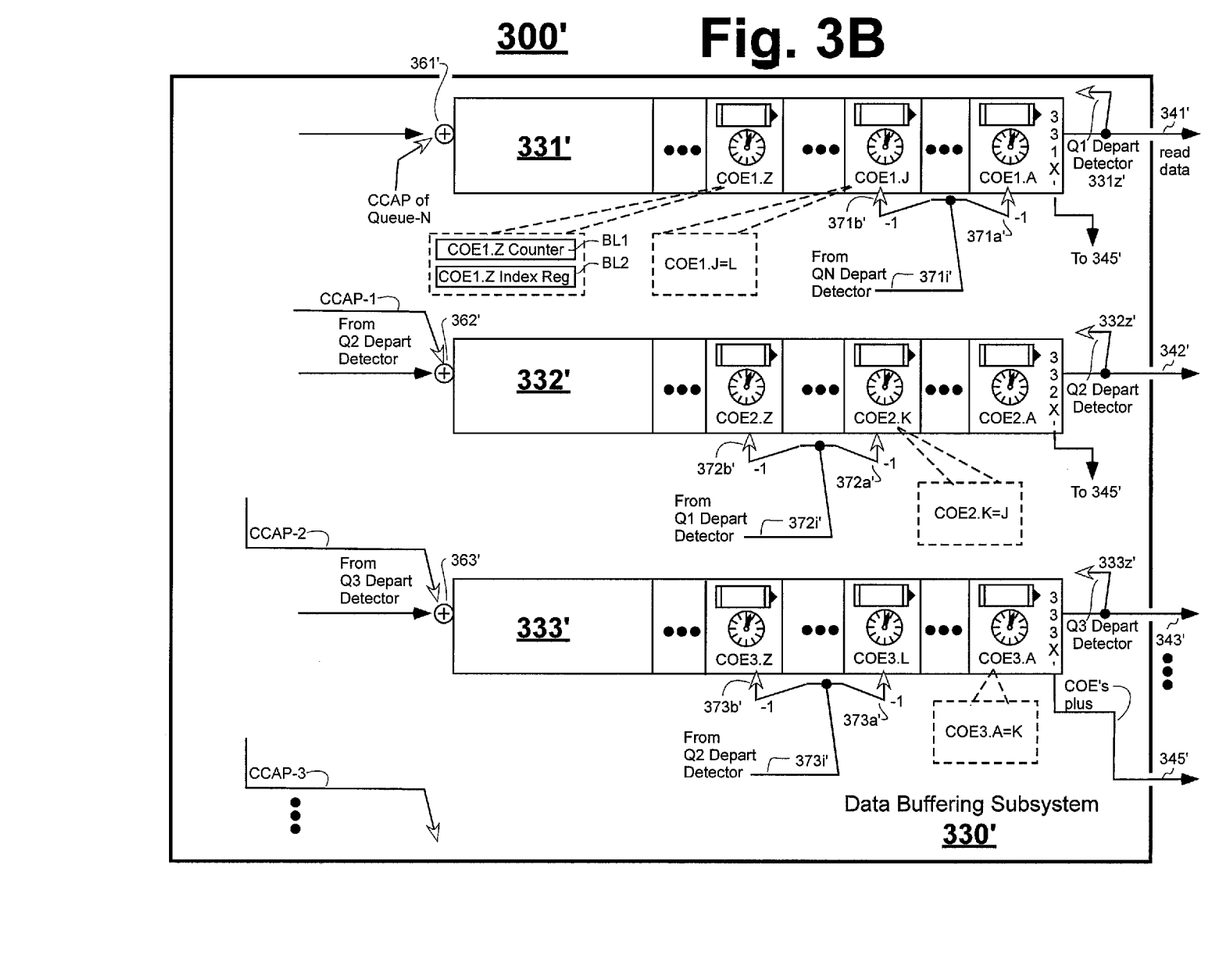
FIG. 3B is a schematic diagram providing a more detailed look at one embodiment in accordance with FIG. 3A.

Referring to FIG. 3B, the latter concept is illustrated as follows. Say that the third queue (FIFO) 333' is filled with packets denoted as having respective COE counters COE3.A through COE3.Z (not necessarily 26 such packets). Say that the departure awaiting packet of gate 333X' has an associated COE3.A value equal to K. That means that in the next above FIFO, 332' there are K in-queue packets (counting backwards from departure gate 332X', namely, those with COE's represented as COE2.A through COE2.K) which arrived earlier. Assume further that the Kth packet in queue 332' has an associated COE2.K value equal to J. That means that in the next above FIFO, 331' there are J in-queue packets (counting backwards from departure gate 331X', namely, those with COE's represented as COE1.A through COE1.J) which arrived even earlier. If COE1.J equals zero, that means that no packets in queue N arrived earlier. On the other hand, if COE1.J equals a nonzero value, L then that means the first most L packets of queue N (where N>3) arrived earlier. So as seen, a scheduler may look up (may read from memory) the COE counts of specific packets in this back tracking manner, and the arbiter/scheduler 370 may then determine the specific arrival orders of the packets if such specific information is needed by its arbitration/scheduling algorithm.

Referring to COE1.Z of FIG. 3B, shown in the associated dashed box is one possible embodiment where the COE count is maintained in a decrementable, zero bottoming out counter (COE1.Z Counter) having a first bit length (BL1). additionally, an index value that uniquely identifies the associated packet in queue 331' is maintained in a register (COE1.Z Index Reg) having a second bit length (BL2). As already mentioned, in one embodiment, the bit length (BL1) of each COE-storing counter (e.g., COE1.Z Counter) or COE-storing memory field of a given queue is equal to the smallest whole power of 2 whose corresponding value of 2 raised that power is equal to or greater than the maximum number of shortest length packets that can be stored at one time in the tracked other queue. So for example, if the maximum number of such queued-up and shortest packets is 255, then a mere length of BL1=8 bits is sufficient for each COE counter to keep track of arrival order irrespective of the length of time between arrivals. Even if the maximum number of such queued-up, pending and shortest packets is substantially larger, say 1023, then a mere length of BL1=10 bits is sufficient for each COE counter to keep track of arrival order irrespective of the length of time between arrivals of the possibly more than one thousand packets that await in the tracked competing queue (e.g., 33N' not shown). Also as mentioned, in one embodiment, each COE-storing counter (e.g., COE1.Z Counter) or COE-storing memory field of a given queue has associated with it an index-storing register (e.g., COE1.z Index Reg) that stores a unique index number identifying the packet whose COE data array is being kept by the associated one or more COE-storing registers (counters). If the maximum number of shortest packets that can be stored at one time in the queue of the corresponding COE is 256, then a mere bit length of BL2=8 bits will suffice for each index-storing register. If the maximum number of shortest packets that can be stored at one time in the queue of the corresponding COE is raised to say, 1024, then a mere bit length of BL2=10 bits will suffice for each index-storing register. Thus the amount of memory consumed for keeping track of relative arrival orders of packets in competing ones of plural queues can be well managed and the problems associated with time stamps can be overcome.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A machine-implemented method for keeping track of relative arrival orders of data blocks entering into corresponding ones of plural First-in, First-out type queues for receipt of service at an egress end of the respective queue, the method comprising:
   determining the number of data blocks awaiting service in each of the plural queues and generating corresponding current count of awaiting packets (CCAP) signals representing the current counts of awaiting data blocks in each of the plural queues;
   associating with each awaiting data block a corresponding dynamic count of earlier arrivals (COE) data array signal representing one or more counts of earlier arriving data blocks in one or more of the plural queues that arrived earlier than the awaiting data block being associated with the corresponding dynamic COE data array signal, where the dynamic COE data array signal is initially set to reflect values of one or more of the CCAP signals when the associated data block enters its respective queue, and where the value of the dynamic COE signal is dynamically reduced in correspondence with the servicing or invalidation or expiration of one or more of the data blocks awaiting service within the plural queues; and
   fetching the associated dynamic COE data array signal of each ready-for-service data block in a departure stage of the plural queues and using the fetched associated dynamic COE data array signal to determine which of the ready-for-service data blocks arrived earliest before dispatching or otherwise servicing the ready-for-service data blocks.

2. The machine-implemented method of claim 1 wherein the data blocks originate from packets transmitted through a network.

3. The machine-implemented method of claim 2 wherein the network exhibits variable latency for packet streams transmitted through the network.

4. The machine-implemented method of claim 2 wherein each of the data blocks includes a complete payload from a respective packet that had been transmitted through the network.

5. The machine-implemented method of claim 1 wherein the data blocks originate from packets transmitted through serial transmission links.

6. The machine-implemented method of claim 1 wherein the data blocks originate from packets transmitted through a PCI-Express network.

7. The machine-implemented method of claim 1 wherein the data blocks pass through ingress pipes of different peak throughput rates before entering respective ones of the plural queues.

8. The machine-implemented method of claim 1 wherein at least two of the plural First-in, First-out type queues are of different buffer depths.

9. The machine-implemented method of claim 1 wherein the determining of the number of data blocks awaiting service includes counting how many data blocks arrive fully and without error into a given queue.

10. The machine-implemented method of claim 1 wherein the associating with each awaiting data block the corresponding dynamic COE data array signal includes appending one or more COE count fields to the corresponding data block.

11. The machine-implemented method of claim 1 wherein the associating with each awaiting data block the corresponding dynamic COE data array signal includes loading one or more COE count signals into one or more of a plurality of COE counters, where the one or more COE counters are physically or logically associated with the corresponding awaiting data block.

12. The machine-implemented method of claim 11 wherein the associating with each awaiting data block the corresponding dynamic COE data array signal includes loading an index value into an index register associated with the corresponding dynamic COE data array signal, where the loaded index value identifies the corresponding awaiting data block of the corresponding COE data array signal.

13. The machine-implemented method of claim wherein the earliest arrived of the ready-for-service data blocks has an associated dynamic COE signal representing a zero count.

14. A method of tracking in-queue packets comprising the machine-implemented steps of:
   determining the number of packets awaiting service in each of a plurality of queues and generating corresponding current count of awaiting packets (CCAP) signals representing the determined number of packets;
   associating with a first packet in a first queue of the plurality of queues, a count of earlier arrivals (COE) data array signal indicating the number of earlier arrived and still pending packets that await in one or more other queue when the first packet enters its respective queue, the COE data array signal initially set to reflect values of one or more of the CCAP signals;
   updating by reducing the count indicated by the COE data array signal in response to one or more of the earlier arrived packets departing from the one or more other queue;
   when the first packet is awaiting service in a departure stage of the first queue and other packets are awaiting service in the departure stages of the one or more other queues, fetching the updated COE data array signal, using the updated COE data array signal to determine which of the first packet and the other packets awaiting service in the departure stages of the one or more other queues arrived earliest and determining the order in which the first packet and the other packets awaiting service in the departure stages of the one or more other queues are to be serviced using the results of the determining which of the first packet and the other packets awaiting service in the departure stages of the one or more other queues arrived earliest; and dispatching or otherwise servicing the first packet in an order based on the determining the order in which the first packet and the other packets awaiting service in the departure stages of the one or more other queues are to be serviced.

15. A machine system comprising:

a plurality of queues;

a plurality of counters, each associated with a respective queue, and each arranged to both determine the number of data blocks awaiting service in the respective queue and generate a corresponding current count of awaiting packets (CCAP) signal representing the determined number of data blocks;

a count associater that associates with each awaiting data block in a queue of the plurality of queues a count of earlier arrivals (COE) data array signal representing a count of earlier arriving data blocks in one or more other queues of the plurality of queues when the associated awaiting data block enters its respective queue, the COE data array signal initially set to reflect values of one or more of the CCAP signals;

a count updater that updates by reducing the count indicated by the COE data array signal upon the servicing or invalidation or expiration of one or more of the earlier arriving data blocks in one or more other queues of the plurality of queues;

a service arbiter operatively coupled to each of the queues in the plurality of queues and configured to determine which ready-for-service data block in the plurality of queues will be serviced first by fetching an associated COE data array signal of each of the ready-for-service data blocks and using the fetched COE data array signals to determine which of the ready-for-service data blocks arrived earliest; and a packet dispatcher operably coupled to the service arbiter and configured to dispatch at least one of the ready-for-service data blocks in the plurality of queues in an order based on the determining which ready-for-service data block in the plurality of queues will be serviced first.

16. The machine system of claim 15 wherein the packet dispatcher is configured to dispatch at least one of the ready-for-service data blocks in the plurality of queues by forwarding the at least one of the ready-for-service data blocks in the plurality of queues to respective down stream processors.

17. The machine system of claim 16 wherein the forwarding of the at least one of the ready-for-service data blocks in the plurality of queues to respective down stream processors includes serially transmitting data of the ready-for-service data blocks to respective ones of the down stream processors.

18. The machine system of claim 17 wherein the serial transmitting of the data includes transmitting the data via a PCI-Express serial link.

19. A packets transfer device that can be embedded within a communications system having a plurality of configurable communication channels where data transfer rates of said channels are at least one time configurable, the device comprising:

a plurality of configurable FIFO's having respectively configurable FIFO depths;

a plurality of counters, each associated with a respective configurable FIFO, and each arranged to both determine the number of packets awaiting service in the respective configurable FIFO and generate a corresponding current count of awaiting packets (CCAP) signal representing the determined number of packets;

a count associater that associates with each awaiting packet in a configurable FIFO of the plurality of configurable FIFO's a count of earlier arrivals (COE) data array signal indicating the number of earlier arriving and still pending packets that await in one or more other configurable FIFO when the associated packet enters its respective configurable FIFO, the COE data array signal initially set to reflect values of one or more of the CCAP signals;

a count updater that updates by reducing the count indicated by each COE data array signal upon the servicing or invalidation or expiration of one or more of the earlier arriving and still pending packets in the plurality of configurable FIFOs;

a service arbiter configured to identify ready-for-service packets in the configurable FIFO's and to determine which ready-for-service packet will be serviced first by fetching an associated COE data array signal of each of the ready-for-service packets and using the fetched COE data array signals to determine at least which of the ready-for-service packets arrived earliest; and a packet dispatcher operably coupled to the service arbiter and configured to dispatch at least one of the identified ready-for-service packets in an order based on the determining which ready-for-service packet will be serviced first.

20. The packets transfer device of claim 19 wherein the plurality of configurable FIFO's are defined in a common buffer memory unit having a data input port coupled to receive ingress data from plural ones of configurable communication channels.

21. The packets transfer device of claim 19 wherein the packets transfer device is included in a monolithic integrated circuit.

* * * * *